(12) United States Patent
Lee et al.

(10) Patent No.: US 11,736,008 B2
(45) Date of Patent: Aug. 22, 2023

(54) MULTI-POWER SUPPLY DEVICE CAPABLE OF CONTROLLING SEQUENCE

(71) Applicant: Power LSI Co. ltd, Daejeon (KR)

(72) Inventors: Won Tae Lee, Bucheon-si (KR); Won Ji Lee, Daejeon (KR); Chang Sik Shin, Chungcheongbuk-do (KR); Chuen Sik Jung, Suwon-si (KR); Gyu Won Lee, Guri-si (KR)

(73) Assignee: Power LSI Co. ltd, Daejeon (KR)

( * ) Notice: Subject to any disclaimer, the term of this patent is extended or adjusted under 35 U.S.C. 154(b) by 0 days.

(21) Appl. No.: 18/170,101

(22) Filed: Feb. 16, 2023

(65) Prior Publication Data

US 2023/0198391 A1 Jun. 22, 2023

Related U.S. Application Data

(63) Continuation of application No. PCT/KR2021/008067, filed on Jun. 28, 2021.

(30) Foreign Application Priority Data

Oct. 15, 2020 (KR) ........................ 10-2020-0133579

(51) Int. Cl.
 *H02M 3/156* (2006.01)
 *H02M 1/00* (2006.01)
(52) U.S. Cl.
 CPC ......... *H02M 3/156* (2013.01); *H02M 1/0025* (2021.05); *H02M 1/0045* (2021.05)
(58) Field of Classification Search
 CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267;
(Continued)

(56) References Cited

U.S. PATENT DOCUMENTS 7,759,917 B2 * 7/2010 Ishino ................. H02M 3/1584
323/272
8,593,115 B2 * 11/2013 Walter ................ H02M 3/1588
323/222
(Continued)

FOREIGN PATENT DOCUMENTS

KR 10-0595868 B1 7/2006
KR 10-2007-0012187 A 1/2007
(Continued)

*Primary Examiner* — Jeffrey A Gblende
(74) *Attorney, Agent, or Firm* — NKL Law; Byungwoong Park

(57) ABSTRACT

The present invention relates to a multi-power supply device capable of controlling a sequence, and more particularly, to a multi-power supply device capable of controlling a sequence for a circuit in which two or more power sources are supplied from the outside and when one of the power sources has a problem so that the power is not supplied to an internal block, an internal voltage is stably supplied from another power source.

5 Claims, 5 Drawing Sheets

(58) Field of Classification Search
CPC ..... G05F 1/575; H02M 5/2573; H02M 1/081;
H02M 5/293; H02M 7/12; H02M 3/10;
H02M 3/125; H02M 3/13; H02M 3/135;
H02M 3/145; H02M 3/15; H02M 3/155;
H02M 3/156; H02M 3/157; H02M 3/158;
H02M 3/1588; H02M 2003/1566; H02M
3/1582; H02M 3/1584; H02M 2003/1557;
H02M 1/0032; H02M 1/4225; H02M
7/217; H02M 1/0025; H02M 1/0045;
H05B 39/048; B23K 11/24; H04B
2215/069
See application file for complete search history.

(56) References Cited

U.S. PATENT DOCUMENTS

| | | | |
|---|---|---|---|
| 9,722,662 B2* | 8/2017 | Yamaoka | H04B 3/145 |
| 2005/0146816 A1 | 7/2005 | Nguyen et al. | |
| 2008/0150436 A1* | 6/2008 | Suzuki | H05B 35/00 |
| | | | 315/169.3 |
| 2013/0076148 A1 | 3/2013 | Sa | |

FOREIGN PATENT DOCUMENTS

| | | |
|---|---|---|
| KR | 10-2010-0011564 A | 2/2010 |
| KR | 10-1379375 B1 | 3/2014 |
| KR | 10-1504884 B1 | 3/2015 |
| KR | 10-2017-0060317 A | 6/2017 |
| KR | 10-1957062 B1 | 3/2019 |
| KR | 10-2232908 B1 | 3/2021 |

\* cited by examiner

MULTI-POWER SUPPLY DEVICE CAPABLE OF CONTROLLING SEQUENCE

Technical Field

The present invention relates to a multi-power supply device capable of controlling a sequence, and more particularly, to a multi-power supply device capable of controlling a sequence for a circuit in which two or more power sources are supplied from the outside and when one of the power sources has a problem so that the power is not supplied to an internal block, an internal voltage is stably supplied from another power source.

Background Art

Voltage regulation is frequently required to prevent variations in supply voltages in various micro devices, such as digital ICs, semiconductor memories, display modules, hard disk drives, RF circuits, microprocessors, digital signal processors, and analog ICs, and especially in applications which use batteries, such as cellular phones, notebook computers, and consumer products.

In electronic communication devices, a power supply device which supplies stable power is the most basic part of the system and as such a power supply device, a switching mode power supply device, such as a DC-DC converter is being actively studied.

Korean Registered Patent No. 10-0595868 discloses a DC/DC converter which finds an error voltage between an output voltage and a first reference voltage to control an output current in accordance with a differential voltage between the error voltage and a second reference voltage to generate a desired output voltage from the input voltage.

Korean Registered Patent No. 10-1379375 discloses a dual-output type DC-DC converter device which generates a positive voltage and a negative voltage.

Korean Registered Patent No. 10-1504884 discloses a DC/DC voltage converter.

Korean Registered Patent No. 10-1957062 discloses a dual input signal inductor boost converter.

In a circuit to which two or more power sources are supplied from the outside, if one of the power sources has a problem, the circuit cannot be used anymore.

Summary

Accordingly, the present invention has been made in an effort to solve the above-described problem and an object of the present invention is to provide a multi-power supply device capable of controlling a sequence for a circuit in which two or more power sources are supplied from the outside and when one of the power sources has a problem so that the power is not supplied to an internal block, an internal voltage is stably supplied from another power source.

A technical object to be achieved in the present invention is not limited to the aforementioned objects, and other not-mentioned objects will be obviously understood by those skilled in the art from the description below.

In order to achieve the objects as described above, according to an aspect of the present invention, a multi-power supply device capable of controlling a sequence includes a first external voltage source VDD_EX1 which supplies a first voltage; a second external voltage source VDD_EX2 which supplies a second voltage which is lower than the first voltage; a regulator 100 which is supplied with the first voltage to generate an internal voltage; an internal block 200 which is supplied with the internal voltage output from the regulator or a second voltage through the second external voltage source; a switch 300 which selects a voltage to be used as a power of the internal block; and a sensing circuit 400 which monitors the second voltage to control the switch.

The regulator 100 includes: an error amplifier 101 in which a first reference voltage VREF is connected to a negative terminal and a voltage at a predetermined ratio with respect to the internal voltage OUT is connected to a positive terminal as a feedback to output a constant voltage at all times; a first switch transistor M1 102 which transmits the first voltage to a node of the internal voltage according to an output of the error amplifier: a first resistor R1 103 and a second resistor R2 104 which are provided in series between a node of the internal voltage and a ground GND to divide the internal voltage at a predetermined ratio; a first capacitor CL1 105 provided between a node of the internal voltage and the ground GND; and a first diode D4 106 which is provided between an output end of the first switch transistor and a node of the internal voltage to suppress inverse current.

The switch 300 includes: a second switch transistor M2 301 which operates in response to a control signal of the sensing circuit 400 to transmit the second voltage to the internal block; a second diode D1 302 and a third diode D2 303 which suppress a parasitic element from being turned on; and a fourth diode D3 304 which supplies an initial driving current of the switch.

The sensing circuit 400 includes: a third resistor R3 401 and a fourth resistor R4 402 which are provided in series between an input node of the second voltage and the ground GND to divide the second voltage at a predetermined ratio; and a comparator 403 in which a second reference voltage VREF2 is connected to a positive terminal and a voltage at a predetermined ratio with respect to the second voltage is connected to a negative terminal so that an output signal is changed according to the second voltage.

When an output of the comparator 403 is logic high (H, High, "1"), the switch is off and the regulator is on and when an output of the comparator 403 is logic low (L, Low, "0"), the switch is on and the regulator is off When the second voltage is lowered, the second switch transistor M2 301 is off and is not supplied with a power from the second external voltage source.

The regulator 100 is enabled when the second voltage is lowered and supplies the internal voltage to the internal block.

According to the multi-power supply device capable of controlling a sequence according to the exemplary embodiment of the present invention, in a circuit in which two or more power sources are supplied from the outside, when one of the power sources has a problem so that the power is not supplied to an internal block, an internal voltage is stably supplied from another power source.

Further, the multi-power supply device capable of controlling a sequence according to an exemplary embodiment of the present invention may be used for a buck converter, a boost converter, a buck-boost converter, a DC-DC converter, an AC-DC converter, a linear regulator, and a device in which two power sources are used to control a circuit internal block to be used in various forms.

Further, according to the multi-power supply device capable of controlling a sequence according to an exemplary embodiment of the present invention, in a circuit to which two power sources having different voltage levels which independently operate are supplied, when a lower-level power has a problem so that the power is not supplied to the internal block, only another power having a high level is used to stably supply the internal voltage. Accordingly, even though one power has a problem, the operation is continued so that the durability of the entire circuit may be increased.

Figure 1:
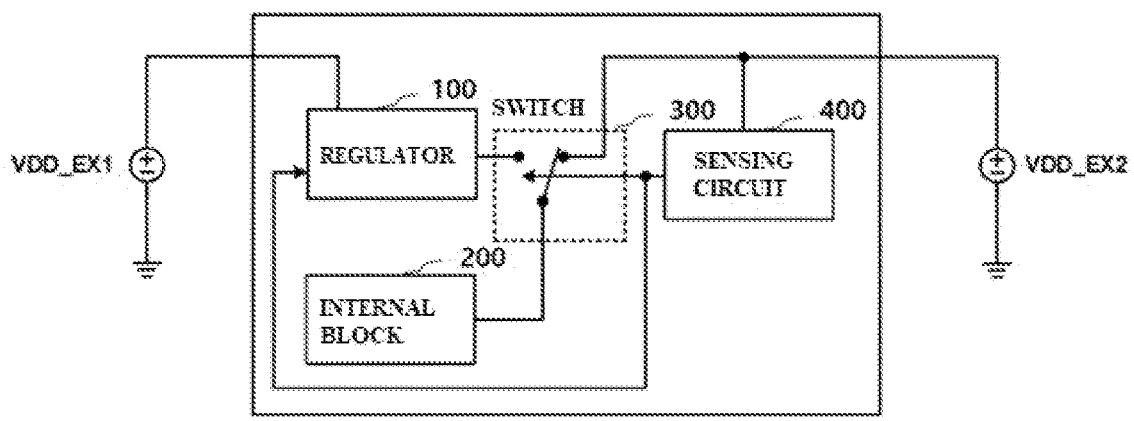
FIG. 1 is a diagram of a multi-power supply device capable of controlling a sequence according to an exemplary embodiment of the present invention.

Description of Reference Numerals and Signs
100: Regulator
200: Internal block
300: Switch
400: Sensing circuit
101: Error amplifier
102: First switch transistor M1
103: First resistor R1
104: Second resistor R2
105: First capacitor CL1
106: First diode D4
301: First switch transistor M2
302: Second diode D1
303: Third diode D2
304: Fourth diode D3
401: Third resistor R3
402: Fourth resistor R4
403: Comparator

DETAILED DESCRIPTION OF EMBODIMENTS

Those skilled in the art may make various modifications to the present invention and the present invention may have various embodiments thereof, and thus specific embodiments will be illustrated in the drawings and described in detail in the detailed description. However, this does not limit the present invention within specific exemplary embodiments, and it should be understood that the present invention covers all the modifications, equivalents, and replacements within the spirit and technical scope of the present invention.

It should be understood that, when it is described that an element is "coupled" or "connected" to another element, the element may be directly coupled or directly connected to the other element or coupled or connected to the other element through a third element.

In contrast, when it is described that an element is "directly coupled" or "directly connected" to another element, it should be understood that no element is present therebetween.

Terms used in the present specification are used only to describe specific exemplary embodiments, and are not intended to limit the present invention. A singular form may include a plural form if there is no clearly opposite meaning in the context. In the present invention, it should be understood that terminology "include" or "have" indicates that a feature, a number, a process, an operation, a component, a part, or the combination thereof described in the specification is present, but does not exclude a possibility of presence or addition of one or more other features, numbers, processes, operations, components, parts or combinations thereof, in advance.

Unless otherwise defined, all terms used herein including technological or scientific terms have the same meaning as those generally understood by a person with ordinary skill in the art. Terms which are defined in a generally used dictionary should be interpreted to have the same meaning as the meaning in the context of the related art but are not interpreted as an ideally or excessively formal meaning if it is not clearly defined in the present application.

Hereinafter, the present invention will be described in detail with reference to accompanying drawings. Prior to this, terms or words used in the present specification and claims should not be interpreted as being limited to typical or dictionary meanings, but should be interpreted as having meanings and concepts which comply with the technical spirit of the present invention, based on the principle that an inventor can appropriately define the concept of the term to describe his/her own invention in the best manner. The terminologies including technical terms and scientific terms used herein have the same meanings that those skilled in the art generally understand, if not defined, and the detailed description of a related known function or configuration that may make the purpose of the present invention unnecessarily ambiguous in describing the present invention will be omitted in the following description and accompanying drawings. The following drawings are provided for sufficiently conveying the concept of the present invention to those skilled in the art. Therefore, the present invention is not limited to the following drawings, but can be specified in the other forms. Further, like reference numerals designate like elements throughout the specification. In the drawings, it should be noted that the same elements will be designated by the same reference numerals although they are shown in different drawings.

Figure 2:
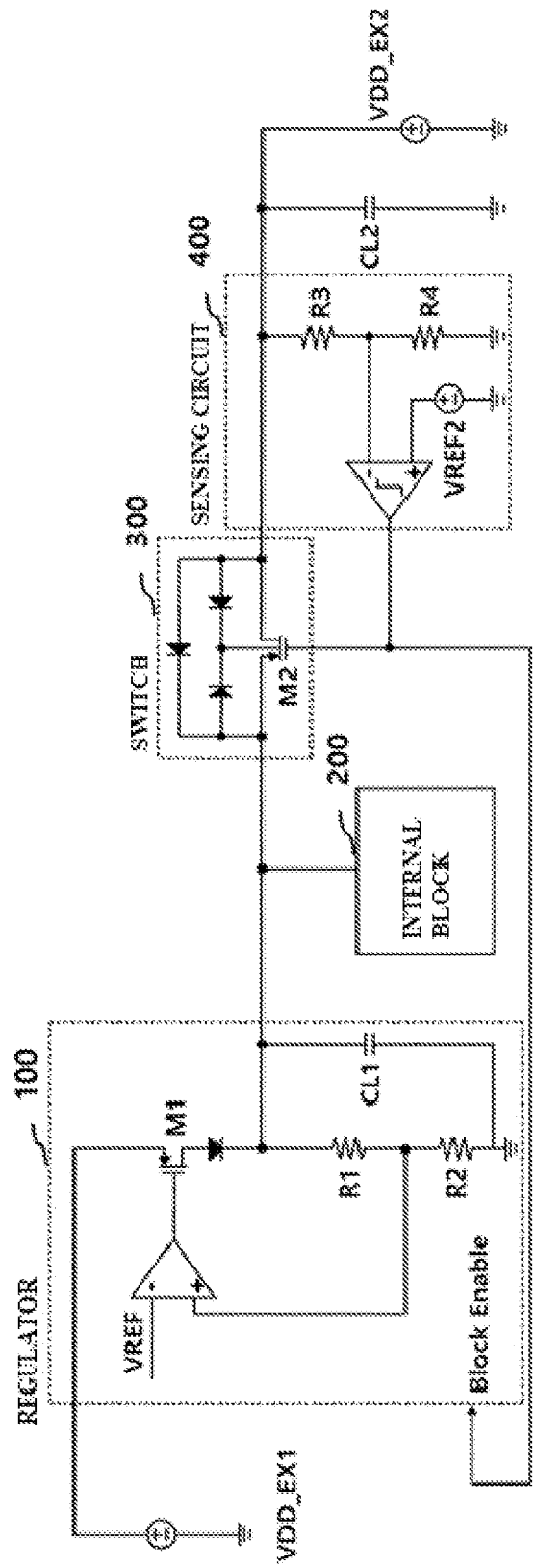
FIG. 2 is a circuit diagram of an exemplary embodiment of a multi-power supply device capable of controlling a sequence according to the present invention.

FIG. 1 is a diagram of a multi-power supply device capable of controlling a sequence according to an exemplary embodiment of the present invention and FIG. 2 is a circuit diagram of an exemplary embodiment of a multi-power supply device capable of controlling a sequence according to the present invention.

As illustrated in FIGS. 1 and 2, a multi-power supply device capable of controlling a sequence according to the present invention includes a first external voltage source VDD_EX1, a second external voltage source VDD_EX2, a regulator 100, an internal block 200, a switch 300, and a sensing circuit 400.

The first external voltage source VDD_EX1 supplies a first voltage.

The second external voltage source VDD_EX2 supplies a second voltage which is lower than the first voltage.

The first external voltage source VDD_EX1 and the second external voltage source VDD_EX2 independently operate.

The regulator 100 receives the first voltage to generate an internal voltage.

The internal block 200 receives the internal voltage output from the regulator 100 or the second voltage through the second external voltage source VDD_EX2.

The switch 300 selects a voltage to be used as a power of the internal block 200.

The sensing circuit 400 monitors the second voltage to control the switch 300.

The switch 300 receives an output signal (control signal) of the sensing circuit 400 to select to be supplied with the power of the internal block 200 from the second external voltage source VDD_EX2 or supplied with the output voltage of the regulator 100.

When the output signal of the sensing circuit 400 is logic high (H, High, "1"), the output voltage of the regulator 100 is used as the power of the internal block 200 and when the output signal of the sensing circuit 400 is logic low (L, Low, "0"), the second external voltage source VDD_EX2 is used as the power of the internal block 200.

Figure 3:
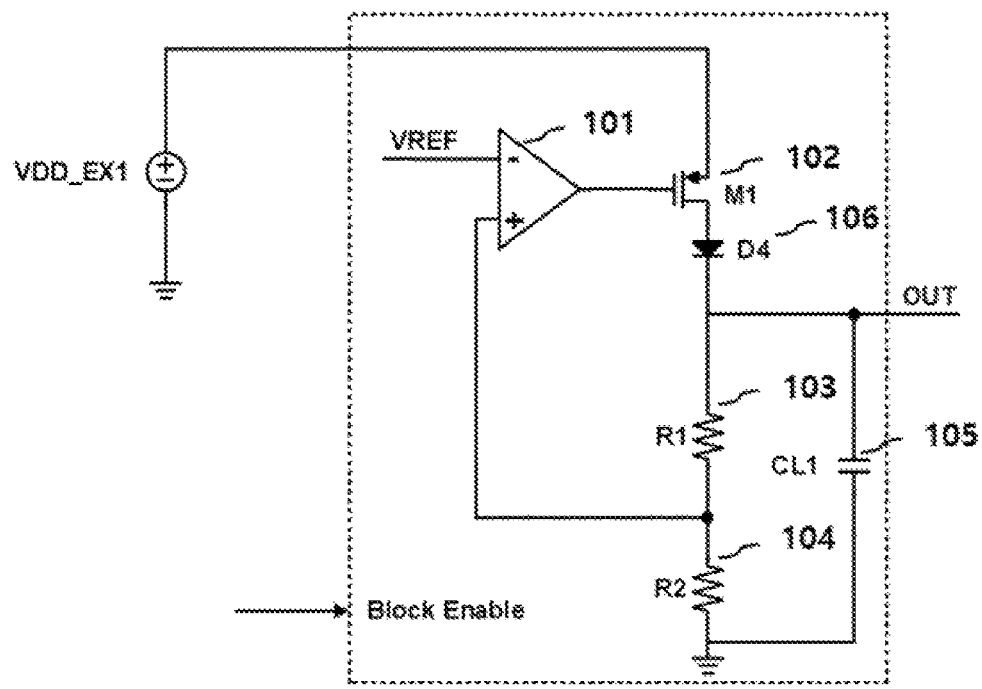
FIG. 3 is a detailed circuit diagram of an exemplary embodiment of a regulator of FIG. 1.

FIG. 3 is a detailed circuit diagram of an exemplary embodiment of a regulator of FIG. 1.

Referring to FIG. 3, the regulator 100 includes an error amplifier 101, a first switch transistor M1 102, a first resistor R1 103, a second resistor R2 104, a first capacitor CL1 105, and a first diode D4 106.

The first reference voltage VREF is connected to a negative terminal of the error amplifier 101 and a voltage at a predetermined ratio with respect to the internal voltage OUT is connected to a positive terminal as a feedback to output a constant voltage at all times.

The first switch transistor M1 102 transmits the first voltage to a node OUT of the internal voltage according to an output of the error amplifier 101.

The first resistor R1 103 and the second resistor R2 104 are provided in series between a node OUT of the internal voltage and the ground GND to divide the internal voltage at a predetermined ratio.

The first capacitor CL1 105 is provided between the node of the internal voltage and the ground GND.

The first diode D4 106 is provided between an output end of the first switch transistor 102 and a node OUT of the internal voltage to suppress an inverse current.

The regulator 100 receives the output signal of the sensing circuit 400 as an enable signal (Block Enable) to enable or disable the power supply to the internal block 200.

When the enable signal Block Enable is logic high (H, High, "1"), the regulator 100 is enabled to supply a power with a predetermined magnitude to the internal block 200.

When the enable signal Block Enable is logic low (L, Low, "0"), the regulator 100 is disabled so as not to supply a power to the internal block 200.

Figure 4:
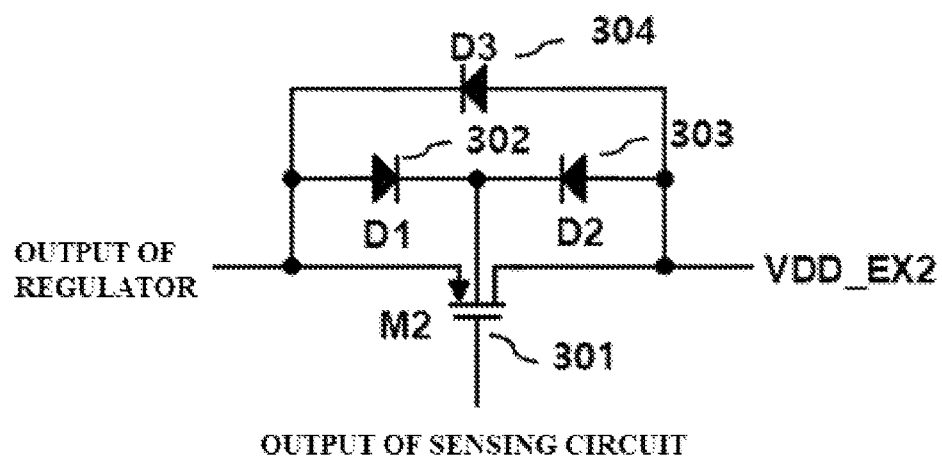
FIG. 4 is a detailed circuit diagram of an exemplary embodiment of a switch of FIG. 1.

FIG. 4 is a detailed circuit diagram of an exemplary embodiment of a switch of FIG. 1.

Referring to FIG. 4, the switch 300 includes a second switch transistor M2 301, a second diode D1 302, a third diode D2 303, and a fourth diode D3 304.

The second switch transistor M2 301 operates in response to the control signal of the sensing circuit 400 to transmit the second voltage to the internal block 200.

The second diode D1 302 and the third diode D2 303 suppress a parasitic element from being turned on.

The fourth diode D3 304 supplies an initial driving current of the switch 300.

Figure 5:
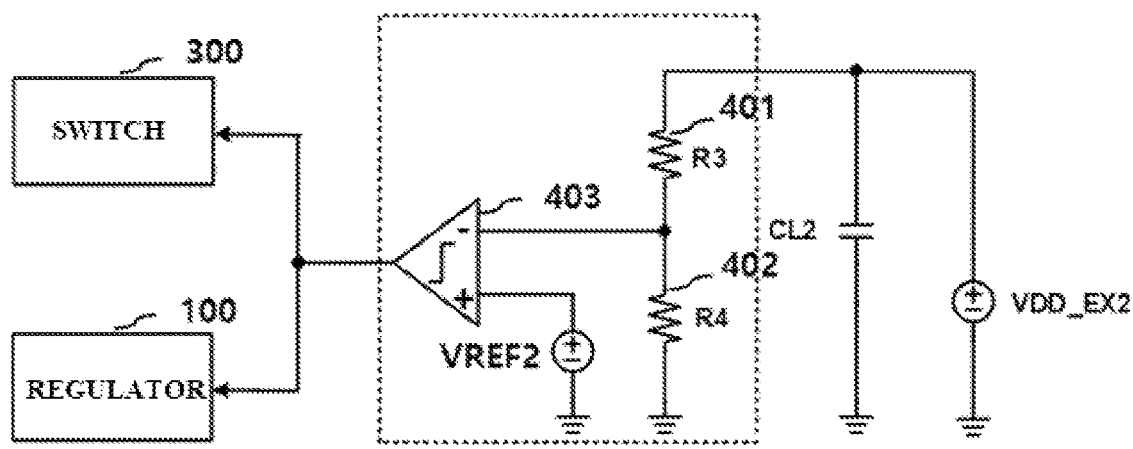
FIG. 5 is a detailed circuit diagram of an exemplary embodiment of a sensing circuit of FIG. 1.

FIG. 5 is a detailed circuit diagram of an exemplary embodiment of a sensing circuit of FIG. 1.

Referring to FIG. 5, the sensing circuit 400 includes a third resistor R3 401, a fourth resistor R4 402, and a comparator 403.

The third resistor R3 401 and the fourth resistor R4 402 are provided in series between an input node of the second voltage and the ground GND to divide the second voltage at a predetermined ratio.

A second reference voltage VREF2 is connected to a positive terminal of the comparator 403 and a voltage at a predetermined ratio with respect to the second voltage is connected to a negative terminal so that an output signal is changed according to the second voltage.

When an output of the comparator 403 is logic high (H, High, "1"), the switch 300 is off and the regulator 100 is on and when an output of the comparator 403 is logic low (L, Low, "0"), the switch 300 is on and the regulator 100 is off.

When the second voltage is lowered, the second switch transistor M2 301 is off and is not supplied with a power from the second external voltage source VDD_EX2.

When the second voltage is lowered, the regulator 100 is enabled so that the regulator 100 supplies the internal voltage to the internal block 200.

Figure 6:
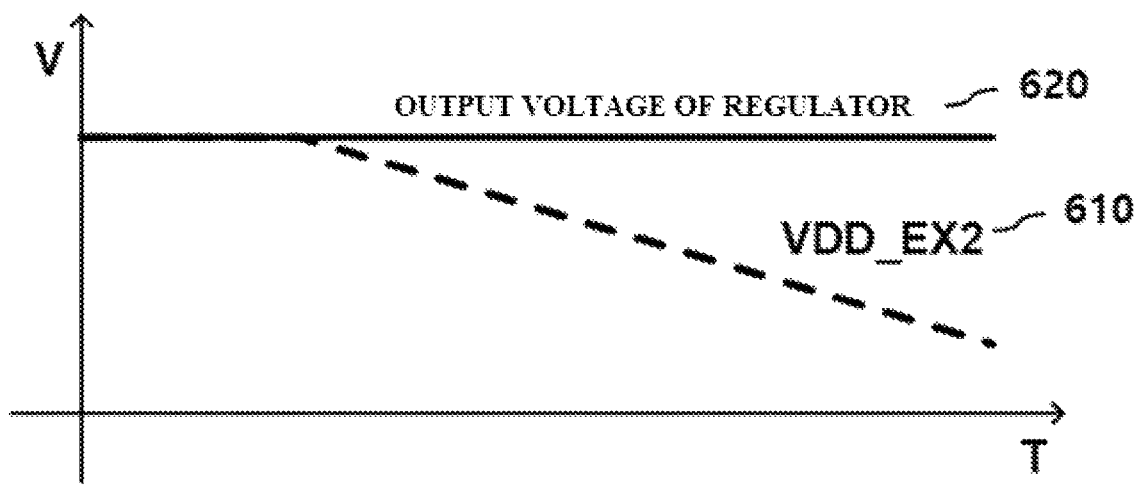
FIG. 6 is a view for explaining an internal voltage of a multi-power supply device capable of controlling a sequence according to an exemplary embodiment of the present invention.

FIG. 6 is a view for explaining an internal voltage of a multi-power supply device capable of controlling a sequence according to an exemplary embodiment of the present invention.

Referring to FIG. 6, even though the second voltage supplied from the second external voltage source VDD_EX2 is lowered or has a problem, a constant voltage 620 may be supplied through the regulator 100.

By doing this, the internal block 200 may maintain the constant voltage by the constant voltage output from the regulator 100 without any problems.

Figure 7:
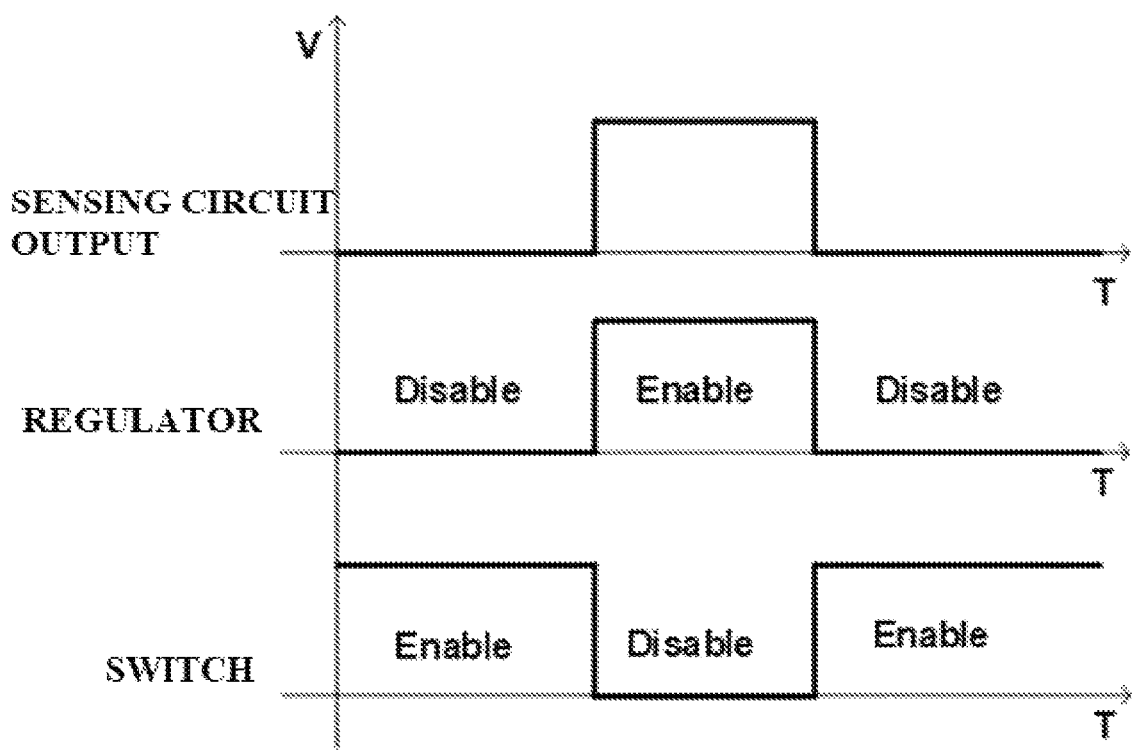
FIG. 7 is a view for explaining an operation of each component of a multi-power supply device capable of controlling a sequence according to one exemplary embodiment of the present invention.

FIG. 7 is a view for explaining an operation of components of a multi-power supply device capable of controlling a sequence according to an exemplary embodiment of the present invention.

Referring to FIG. 7, when an output of the sensing circuit 400 is in a logic low (L, Low, "0") state, the regulator 100 is disabled and the switch 300 is enabled.

Thereafter, when the output of the sensing circuit 400 is changed from the logic low (L, Low, "0") state to a logic high (H, High, "1") state, the regulator 100 is enabled and the switch 300 is disabled.

Thereafter, when the output of the sensing circuit 400 is changed from the logic high (H, High, "1") state to the logic low (L, Low, "0") state, the regulator 100 is disabled and the switch 300 is enabled.

The present invention is not limited to the above-described exemplary embodiment and has various applicable ranges and various modifications can be made without departing from the gist of the present invention claimed in the claims.

The invention claimed is:

1. A multi-power supply device capable of controlling a sequence, comprising:
    a first external voltage source (VDD_EX1) which supplies a first voltage;
    a second external voltage source (VDD_EX2) which supplies a second voltage which is lower than the first voltage;
    a regulator (100) which is supplied with the first voltage to generate an internal voltage;
    an internal block (200) which is supplied with the internal voltage output from the regulator or a second voltage through the second external voltage source;
    a switch (300) which selects a voltage to be used as a power of the internal block; and a sensing circuit (400) which monitors the second voltage to control the switch, wherein the regulator (100) includes:

an error amplifier (101) in which a first reference voltage (VREF) is connected to a negative terminal and a voltage at a predetermined ratio with respect to the internal voltage (OUT) is connected to a positive terminal as a feedback to output a constant voltage at all times;

a first switch transistor (M1, 102) which transmits the first voltage to a node of the internal voltage according to an output of the error amplifier;

a first resistor (R1 103) and a second resistor (R2 104) which are provided in series between a node of the internal voltage and a ground (GND) to divide the internal voltage at a predetermined ratio;

a first capacitor (CL1 105) provided between the node of the internal voltage and the ground (GND); and a first diode (D4 106) which is provided between an output end of the first switch transistor and the node of the internal voltage to suppress inverse current, and wherein the switch (300) includes:

a second switch transistor (M2 301) which operates in response to a control signal of the sensing circuit (400) to transmit the second voltage to the internal block;

a second diode (D1 302) and a third diode (D2 303) which suppress a parasitic element from being turned on; and a fourth diode (D3 304) which supplies an initial driving current of the switch.

2. The multi-power supply device according to claim 1, wherein the sensing circuit (400) includes:

a third resistor (R3 401) and a second resistor (R4 402) which are provided in series between an input node of the second voltage and a ground (GND) to divide the second voltage at a predetermined ratio; and a comparator (403) in which a second reference voltage (VREF2) is connected to a positive terminal and a voltage at a predetermined ratio with respect to the second voltage is connected to a negative terminal so that an output signal is changed according to the second voltage.

3. The multi-power supply device according to claim 2, wherein when an output of the comparator (403) is logic high (H, High, "1"), the switch is off and the regulator is on and when the output of the comparator (403) is logic low (L, Low, "0"), the switch is on and the regulator is off.

4. The multi-power supply device according to claim 3, wherein when the second voltage is lowered, the second switch transistor (M2 301) is off and is not supplied with a power from the second external voltage source.

5. The multi-power supply device according to claim 4, wherein the regulator (100) is enabled when the second voltage is lowered to supply the internal voltage to the internal block.

* * * * *